United States Patent
Matsumoto

(10) Patent No.: US 11,461,268 B2
(45) Date of Patent: Oct. 4, 2022

(54) INFORMATION PROCESSING SYSTEM AND CONTROL METHOD

(71) Applicant: CANON KABUSHIKI KAISHA, Tokyo (JP)

(72) Inventor: Tetsuya Matsumoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 28 days.

(21) Appl. No.: 15/971,512

(22) Filed: May 4, 2018

(65) Prior Publication Data

US 2018/0349392 A1 Dec. 6, 2018

(30) Foreign Application Priority Data

May 30, 2017 (JP) .............................. JP2017-107071

(51) Int. Cl.

| | |
|---|---|
| *G06F 16/11* | (2019.01) |
| *G06F 16/13* | (2019.01) |
| *G06F 16/23* | (2019.01) |
| *G06F 11/07* | (2006.01) |
| *G06F 9/54* | (2006.01) |
| *G06F 9/50* | (2006.01) |

(52) U.S. Cl.
CPC .......... *G06F 16/125* (2019.01); *G06F 9/5083* (2013.01); *G06F 9/546* (2013.01); *G06F 11/0712* (2013.01); *G06F 11/0727* (2013.01); *G06F 16/13* (2019.01); *G06F 16/23* (2019.01)

(58) Field of Classification Search
CPC .. G06F 16/1774; G06F 16/125; G06F 9/5083; G06F 16/13; G06F 16/23; G06F 11/0712; G06F 9/546; G06F 11/0727
See application file for complete search history.

(56) References Cited

U.S. PATENT DOCUMENTS

| | | | | |
|---|---|---|---|---|
| 5,115,392 | A * | 5/1992 | Takamoto | G06F 9/466 718/101 |
| 7,146,233 | B2 * | 12/2006 | Aziz | G06F 9/45504 700/101 |
| 2011/0145077 | A1 * | 6/2011 | Nochi | G06Q 40/02 705/16 |
| 2011/0246434 | A1 | 10/2011 | Cheenath | |

(Continued)

FOREIGN PATENT DOCUMENTS

| | | |
|---|---|---|
| JP | 63-094360 A | 4/1988 |
| JP | 2015-072716 A | 4/2015 |

*Primary Examiner* — Cam Linh T Nguyen
(74) *Attorney, Agent, or Firm* — Canon U.S.A., Inc. IP Division

(57) ABSTRACT

An information processing system manages data on customers using tenants which are storage regions dedicated for the customers of a database and registers a message for processing data of a processing target in a queue. The data is processed by accessing the tenants corresponding to the data so as to refer to the tenants based on the message. The information processing system registers a message for processing a plurality of data of processing targets as a batch process in the queue in a case where the plurality of data satisfy the predetermined condition when the message for processing a plurality of data of processing targets is to be registered in the queue. In the process performed on the plurality of data, the different tenants are accessed to be referred to.

12 Claims, 9 Drawing Sheets

(56) References Cited

U.S. PATENT DOCUMENTS

| | | | | |
|---|---|---|---|---|
| 2012/0023369 A1* | 1/2012 | Bourbonnais | ........... | G06F 9/466 |
| | | | | 714/16 |
| 2013/0145371 A1* | 6/2013 | Brunswig | ........... | G06F 11/1474 |
| | | | | 718/101 |
| 2014/0089282 A1* | 3/2014 | Sampathkumar | ....... | G06F 16/24 |
| | | | | 707/705 |
| 2014/0278812 A1* | 9/2014 | Reinhold | ........... | G06Q 10/0637 |
| | | | | 705/7.36 |
| 2014/0304246 A1* | 10/2014 | Helmich | ................. | G06F 9/546 |
| | | | | 707/704 |
| 2017/0317935 A1* | 11/2017 | Murthy | ................... | G06F 15/17 |

* cited by examiner

INFORMATION PROCESSING SYSTEM AND CONTROL METHOD

BACKGROUND OF THE INVENTION

Field of the Invention

The present disclosure relates to an information processing system which executes a process based on a message registered in a queue and a control method.

Description of the Related Art

Information processing systems which are constituted using a cloud service platform and which provide services for customers have been used. Furthermore, information processing systems which realize a process asynchronously performed and a process periodically performed by a mechanism using a queue have been used. Information processing systems constituted using a cloud service platform perform a periodic process on all customers. Examples of the periodic process include a periodic totaling process performed on customer data. In the periodic totaling process, data to be processed is increased and a period of time required for the process is increased as the number of customers managed by a service is increased.

Japanese Patent Laid-Open No. 2015-072716 discloses a technique of increasing and decreasing the number of servers which execute a process on messages in accordance with the number of messages registered in a queue. By increasing and decreasing the number of cloud sources (servers) in accordance with the number of processing requests to a system, the cloud resources may be appropriately used and cost may be reduced.

In such a totaling process described above, the process is executed when a server which executes the process issues a query to a database. In a system which manages customer data in tenants which are storage regions dedicated for customers in a database, a process is generally performed for each tenant of data to be processed. Accordingly, a processing time is increased in proportion to the number of tenants of the data to be processed. In such a case, the number of queries issued to the database is increased and a load of the database is increased in accordance with the increase of the number of servers which execute the process. Unlike the servers which execute the process, it is difficult to dynamically increase the number of databases (without stopping the system) or improve performance of the database.

Accordingly, use of the process such as the periodic totaling may not address an issue in which a long period of time is required for performing the process only by increasing the number of servers which execute the process in accordance with the number of tenants of data to be processed.

SUMMARY OF THE INVENTION

According to an aspect of the present disclosure, an information processing system includes a system of a database which manages data on customers using tenants which are storage regions dedicated for the customers, a queue in which a message for processing data of a processing target is registered, and an execution system which obtains the message, accesses the database so as to refer to a tenant corresponding to the data of the processing target based on the obtained message, and executes a process on the data using at least one machine. The information processing system further includes a memory for storing instructions, and a processor for executing the instructions to cause an information processing system to generate a message for performing a batch process on data of processing targets individually managed by the tenants when the data satisfies a predetermined condition, and register the generated message in the queue. The execution system accesses the database so as to refer to different tenants when the batch process is performed on the data.

Further features of the disclosure will become apparent from the following description of exemplary embodiments with reference to the attached drawings.

DESCRIPTION OF THE EMBODIMENTS

Hereinafter, various embodiments of the present disclosure will be described with reference to the accompanying drawings.

First Embodiment

System Configuration

Figure 1:
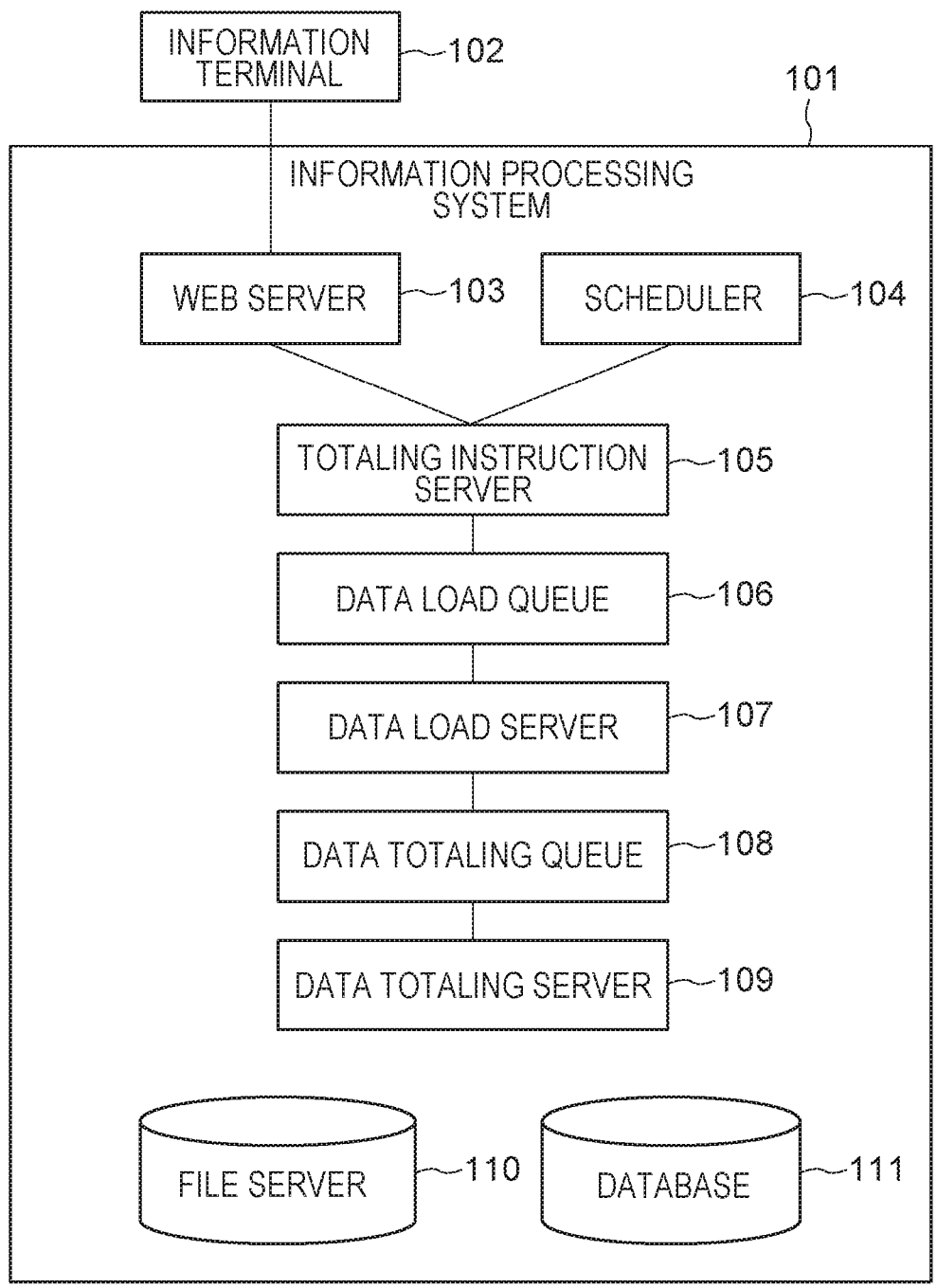
FIG. 1 is a diagram illustrating an example of an entire configuration of a system according to an embodiment of the disclosure.

FIG. 1 is a diagram illustrating an example of an entire configuration of a system according to an embodiment of the disclosure.

In FIG. 1, an information processing system 101 is constituted using a cloud service platform and provides services for customers. In a cloud service, a cloud service vender provides computer resources including virtual machines, queues, and storages for a user through a network. Here, the virtual machines are logical computers which are obtained by dividing servers into logical units without considering a physical configuration by means of a virtualizing technique and which operate with individual operating systems.

The information processing system 101 includes a web server 103, a scheduler 104, a totaling instruction server 105, a data load queue 106, and a data load server 107. The information processing system 101 further includes a data totaling queue 108, a data totaling server 109, a file server 110, and a database 111. Functions of the components included in the information processing system 101 are realized using virtual machines, queues, and storages serving as computer resources provided by a cloud service vender.

Here, in the information processing system 101, information on customers is individually managed by tenants which are dedicated storage regions included in the database 111. When the user intends to access information managed by a management system, the user may access only data held by a customer tenant to which the user belongs and access to other tenants is restricted.

An information terminal 102 is a personal computer (PC), for example, used by a user who is one of customers who use a service provided by the information processing system 101. The user transmits a request for executing a process to the information processing system 101 through a web page provided by the information processing system 101.

The web server 103 provides a web page to be used by the user to use a service. The web server 103 receives a request for executing a process issued by the user through the web page. When the process requested to be executed is a totaling process, the web server 103 transmits a totaling request of a customer corresponding to the user to the totaling instruction server 105. Note that a plurality of web servers 103 may be provided.

The scheduler 104 issues a request for executing a periodic process. The periodic process indicates a process periodically executed. At a time point when the periodic process is to be executed which is set in advance, the scheduler 104 issues a request for executing the periodic process. In a case of a periodic totaling process, the scheduler 104 transmits a periodic totaling request to the totaling instruction server 105. Note that the periodic totaling process is performed on all customers managed by the information processing system 101.

The totaling instruction server 105 generates a message for executing the totaling process and registers the message in the data load queue 106. When receiving the totaling request from the web server 103 or the scheduler 104, the totaling instruction server 105 generates a data load request message including data of a customer of a processing target (a plurality of customers may be specified) and registers the data load request message in the data load queue 106. Note that a plurality of totaling instruction servers 105 may be provided.

The data load queue 106 manages the registered data load request message. The data load queue 106 brings a message into an invisible state until a predetermined period of time has elapsed after the message is obtained (hereinafter, the predetermined period of time is referred to as an "invisible time").

The message stored in the data load queue 106 is not deleted from the queue when the message is obtained from the queue. The message obtained from the queue is temporarily brought into an invisible state so as not to be obtained by other processing servers. After the process performed by the data load server 107 in accordance with the message is completed, an instruction for deleting the message is issued to the queue.

Since the invisible state is entered, while a certain data load server processes the message, other data load servers may not obtain the same message or may not perform the process based on the message. Furthermore, during a certain period of time after the data load server 107 deletes the message from the queue, if an instruction for deleting the message is not issued to the queue, the invisible state of the message is cancelled and the message may be obtained by any data load server. An appropriate value is set to the invisible time set to the queue depending on a process taking a period of time required for processing the message and a retry interval required at a time of processing failure into consideration.

The data load server 107 obtains the message registered in the data load queue 106 and executes a data load process. In the data load process, data to be used in the totaling process is loaded to the database 111 to be used in the totaling process. Specifically, in the data load process, the database 111 is accessed so that a tenant corresponding to data of a processing target is referred to based on the massage obtained from the data load queue 106. Here, when a plurality of data is to be processed, the database 111 is to be accessed so that different tenants for different data are referred to. The data load process is also referred to as a batch process performed on a plurality of tenants. After the data load process, the data load server 107 generates a data totaling request message including information on a customer of the processing target and registers the data totaling request message in the data totaling queue 108 so as to execute a data totaling process which is a subsequent process. Note that a plurality of data load servers 107 may be provided. The number of data load servers 107 is automatically controlled based on the number of messages stored in the data load queue 106 or a processing load of the data load server 107.

The data totaling queue 108 manages the registered data totaling request message.

The data totaling server 109 obtains the message registered in the data totaling queue 108 and executes a data totaling process. Note that a plurality of data totaling servers 109 may be provided. The number of data totaling servers 109 is automatically controlled based on the number of messages stored in the data totaling queue 108 or a processing load of the data totaling server 109.

The file server 110 stores various data files managed by the information processing system 101.

The database 111 stores various data managed by the information processing system 101. The database 111 manages data of the customers using the tenants which are storage regions dedicated for the customers. Furthermore, the database 111 receives a query and returns a result of the query.

The information terminal 102 to the database 111 described above are connected to one another in a communication available manner by a general technique, such as the Internet.

Internal Configuration of Information Processing Apparatus

Figure 2:
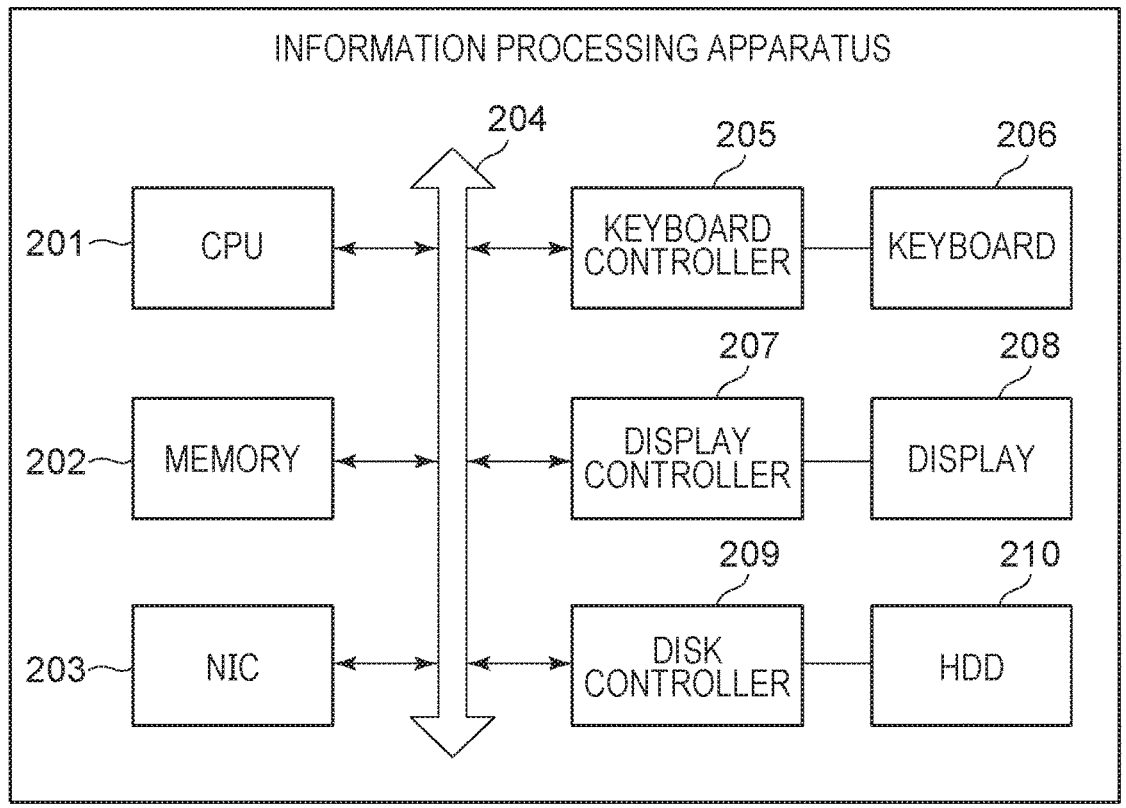
FIG. 2 is a diagram illustrating an example of a hardware configuration of an information processing apparatus.

FIG. 2 is a diagram illustrating an example of a hardware configuration of an information processing apparatus. Examples of the information processing apparatus of this embodiment include a server computer installed in a data center which realizes the information terminal 102 and the information processing system 101.

The information processing apparatus includes a central processing unit (CPU) 201 which executes software stored in a hard disk drive (HDD) 210 which is a storage device. The CPU 201 integrally controls various hardware connected to a system bus 204.

A memory 202 functions as a main memory, a work area, and the like of the CPU 201.

A network interface card (NIC) 203 performs data transmission and data reception with other nodes through a network.

A keyboard controller 205 controls an instruction input from a keyboard 206 of the PC. Note that the information processing apparatus may not include the keyboard controller 205 or the keyboard 206 depending on a role of the information processing apparatus.

A display controller 207 controls display of a display module 208 constituted by a liquid crystal display, for example. Note that the information processing apparatus may not include the display controller 207 or the display module 208 depending on a role of the information processing apparatus.

A disk controller 209 controls the HDD 210 which is a mass storage.

Note that functions described below are realized when the CPU 201 reads programs stored in the HDD 210 of the server computer which constitutes the information processing system 101 in the memory 202 and executes the programs.

Functional Configuration of Totaling Instruction Server

Figure 3:
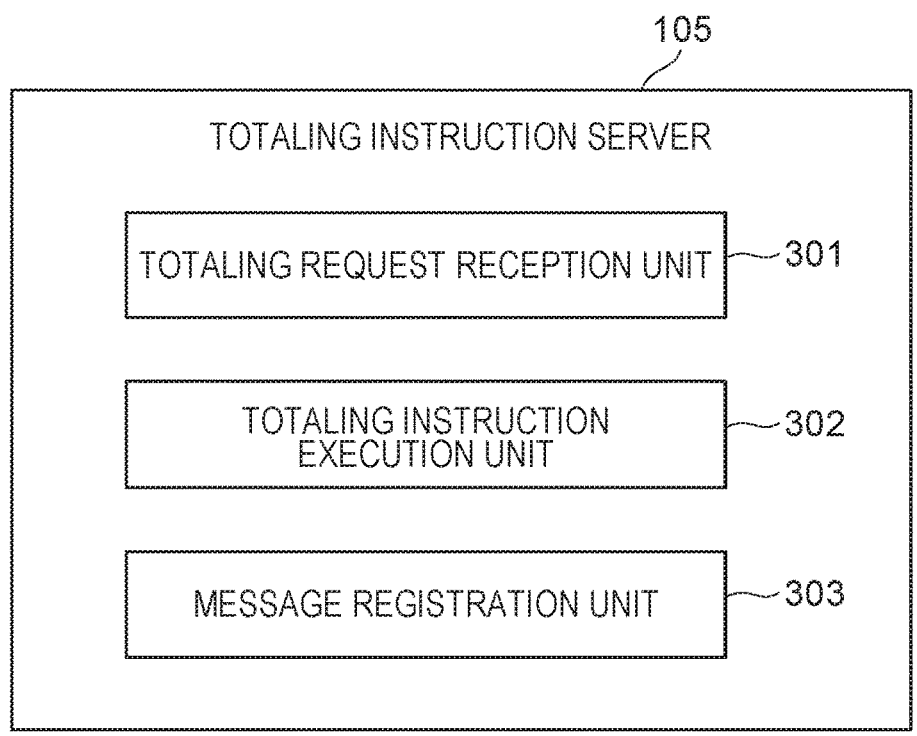
FIG. 3 is a diagram illustrating an example of a functional configuration of a totaling instruction server.

FIG. 3 is a diagram illustrating an example of a functional configuration of the totaling instruction server 105.

A totaling request reception unit 301 receives a totaling request from the web server 103 or the scheduler 104. A totaling instruction execution unit 302 executes a totaling instruction process after the totaling request is received and generates a massage for a data load request. A message registration unit 303 registers the generated message in the data load queue 106. The totaling instruction process will be described in detail hereinafter.

Functional Configuration of Data Load Server

Figure 4:
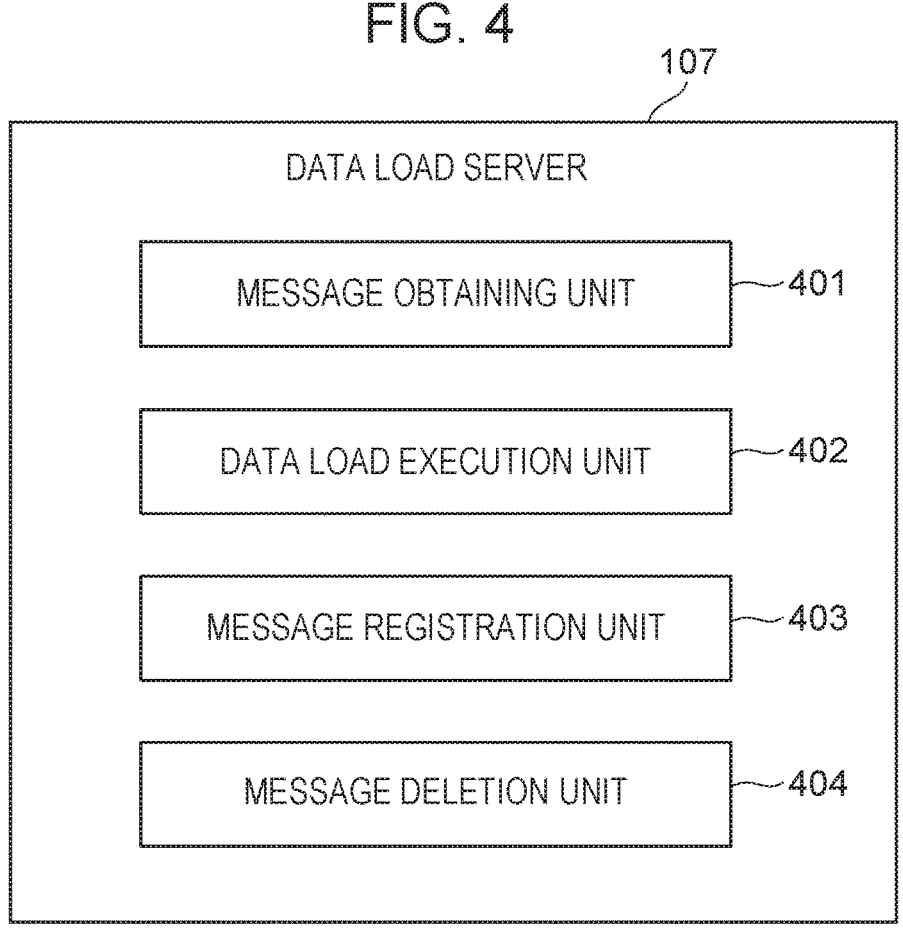
FIG. 4 is a diagram illustrating an example of a functional configuration of a data load server.

FIG. 4 is a diagram illustrating an example of a functional configuration of the data load server 107.

A message obtaining unit 401 obtains the message registered in the data load queue 106. A data load execution unit 402 executes a data load process after the message is obtained. The data load execution unit 402 generates a data totaling request message after the data load process. The data load execution unit 402 generates a retry message described below with reference to FIG. 8 and registers the message in the data load queue 106. A message registration unit 403 registers the generated message in the data totaling queue 108. A message deletion unit 404 deletes the executed message from the data load queue 106 after the execution of the process. The data load process will be described in detail hereinafter.

Functional Configuration of Data Totaling Server

Figure 5:
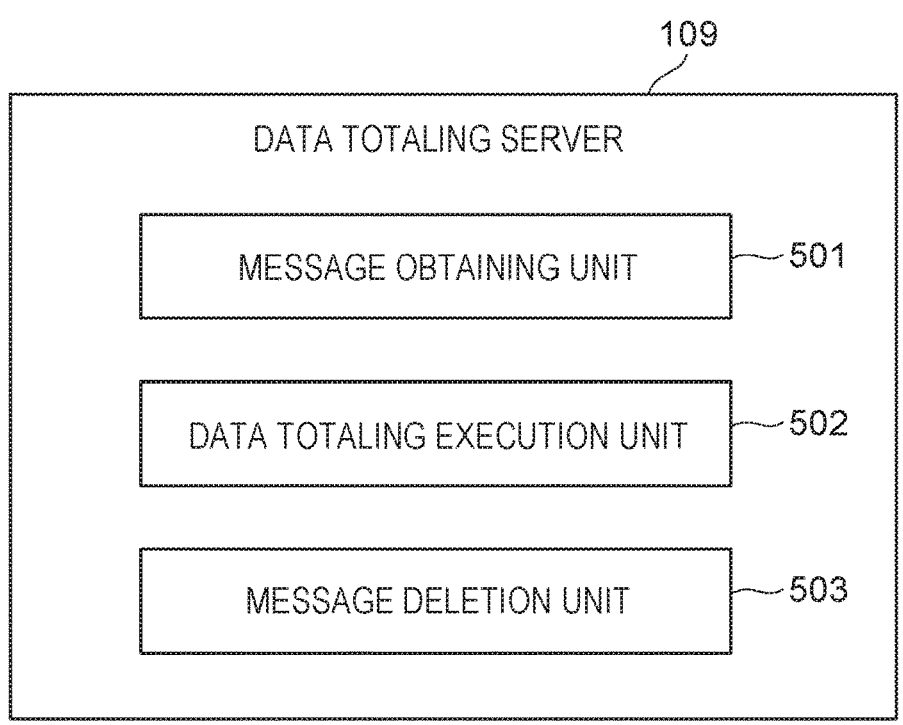
FIG. 5 is a diagram illustrating an example of a functional configuration of a data totaling server.

FIG. 5 is a diagram illustrating an example of a functional configuration of the data totaling server 109.

A message obtaining unit 501 obtains the message registered in the data totaling queue 108. A data totaling execution unit 502 executes a data totaling process after the message is obtained. A message deletion unit 503 deletes the executed message from the data totaling queue 108 after the execution of the process. The data totaling process will be described in detail hereinafter.

Totaling Instruction Process

Figure 6:
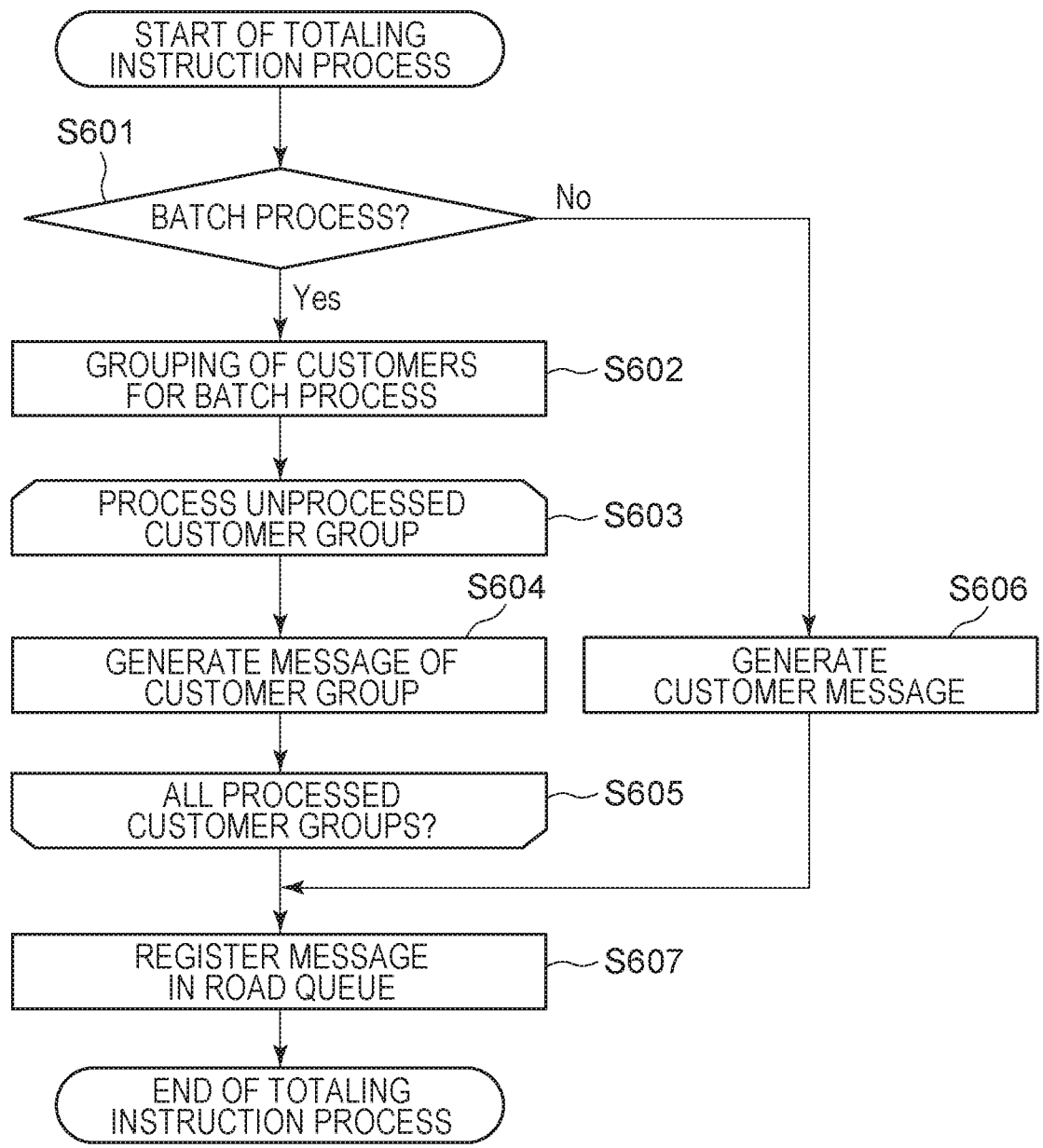
FIG. 6 is a flowchart illustrating an example of a procedure of a totaling instruction process.

FIG. 6 is a flowchart illustrating an example of a procedure of the totaling instruction process executed by the totaling instruction server 105. This process is started when the totaling request is received from the web server 103 or the scheduler 104. In this process, a message for executing the totaling process (a data load request message) is generated based on the received totaling request and is registered in the data load queue 106. In the data load process, data to be used in the totaling process is loaded to the database 111 to be used in the totaling process. In the data load process, a batch process performed on a plurality of customers is more sufficient than a process performed on each customer. Furthermore, the data load process does not depend on a setting for each customer, and therefore, the batch process may be performed on all the customers to be processed. Therefore, in this process, it is determined whether a plurality of customers are to be subjected to the batch process based on the received totaling request. When the determination is affirmative, the customers processible in the batch process are grouped and a processing request message is generated for each customer group. Therefore, the data load process is performed as the budge process on the plurality of customers and a dependence degree on the number of customers in the processing time may be reduced.

When the totaling instruction is started, in step S601, the totaling instruction execution unit 302 determines whether the batch process is to be performed on a plurality of customers based on a determination as to whether data of a processing target satisfies a certain condition in response to the received totaling request. In this embodiment, it is determined that the batch process is to be performed in a case where the data of the processing target of the received totaling request satisfies the certain condition, and therefore, the data is a processing target of a periodic totaling process. Here, when the determination is affirmative in step S601, the process proceeds to step S602. On the other hand, when the determination is negative in step S601, that is, the process is performed on each customer, the process proceeds to step S606.

Subsequently, in step S602, the totaling instruction execution unit 302 groups all the customers managed by the system in a unit processible in the batch process. Note that the customers of processing targets may be a number of all the customers managed by the system. If data of different customers is stored in different database schemas or different tables, customers stored in the same schema or the same table are determined to be the same group, for example.

Subsequently, in step S603, the totaling instruction execution unit 302 repeatedly performs a process from step S603 to step S605 on individual customer groups which have not been processed.

In step S604, the totaling instruction execution unit 302 generates a data load request message of the customer group being processed. In this process, a message for requesting a batch process to be performed on a plurality of customers processible in the batch process is generated. An example of the data load request message generated in this process (a JSON format) will be described below. In this example, information on the plurality of customers processible in the batch process is specified by an array of customer IDs. The customer IDs uniquely identify the customers in the system.
{"customers": ["100", "110", "120"]}

In step S605, the totaling instruction execution unit 302 determines whether all the customer groups have been processed in step S603 to step S605. When the determination is negative, the process returns to step S603 and the process is performed again. On the other hand, when the determination is affirmative, the process proceeds to step S607.

In step S606, the totaling instruction execution unit 302 generates a data load request message of a customer of a received totaling request. In this process, a message for requesting a process to be performed on one customer by one message is generated.

In step S607, the message registration unit 303 registers the message generated in step S604 or step S606 in the data load queue 106 and this process is terminated.

Data Load Process

Figure 7:
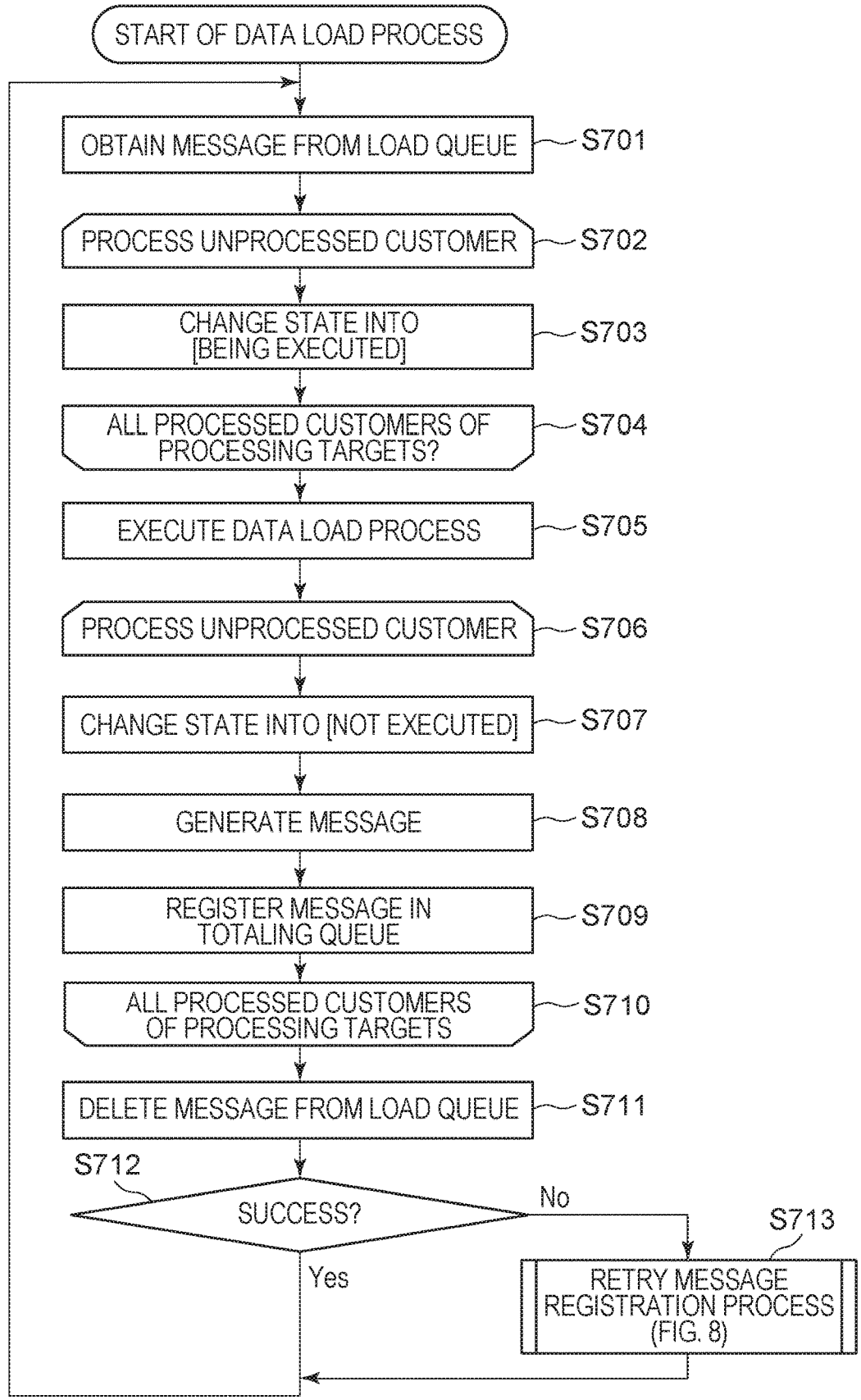
FIG. 7 is a flowchart illustrating an example of a procedure of a data load process.

FIG. 7 is a flowchart illustrating an example of a procedure of the data load process executed by the data load server 107. This process is executed when the data load server 107 checks a message registered in the data load queue 106 and detects an obtainable message. In the data load process, data to be used in the totaling process is loaded to the database 111 to be used in the totaling process. In the data load process, a batch process performed on a plurality of customers is more sufficient than a process performed on each customer. Furthermore, the data load process does not depend on a setting for each customer, that is, the same data load process is performed on all the customers. Therefore, in a process of executing data load in this process, the process is performed on a plurality of customers as a batch process instead of each customer. By this, a degree of dependence on the number of customers in the processing time may be reduced. Furthermore, the data load server 107 generates a data totaling request message and registers the message in the data totaling queue 108 so that the data totaling process which is a subsequent process of the data load process is executed. The data totaling process depends on a setting of each customer unlike the data load process, and therefore, the data totaling request message is generated for each customer.

When the data load process is started, the message obtaining unit 401 obtains one obtainable message from the data load queue 106 in step S701.

In step S702, the data load execution unit 402 individually performs the process from step S702 to step S704 on a number of unprocessed customers in the customers of the processing targets specified by the message obtained in step S701 in a repetitive manner. The process is performed before execution of the data load process on a plurality customers described below in step S705.

In step S703, the data load execution unit 402 changes totaling states of the individual customers being processed into "being executed". Here, Table A is a totaling state table which is stored in the database 111 and which illustrates an example of a configuration of information on the totaling states to be used in the data load process and the data totaling process. This table includes a customer ID column indicating a customer corresponding to totaling state information in a target record. Furthermore, this table includes a state column indicating a totaling state of the customer. In this embodiment, examples of the state include "being executed" and "not executed". The state "being executed" corresponds to a period of time from when a process associated with totaling is started to when the process is completed. The state "not executed" corresponds to a period of time when the process associated with totaling is not executed. In this process, only when a totaling state of a customer being processed is the state "not executed", the state may be changed to the state "being executed". When the totaling state of the customer being processed is the state "being executed", it is determined that the process performed on the customer being processed has failed. By this, a plurality of servers are prevented from simultaneously performing the process on the same customer. Note that, when a predetermined period of time has elapsed after it is determined that the process performed on the customer corresponding to the totaling state "being executed" has failed, the totaling state returns to "not executed". Accordingly, the process may be retried on the customer.

TABLE 1

Table A
Totaling State Table

| Customer ID | State |
|---|---|
| 100 | Being Executed |
| 101 | Not Executed |
| 102 | Not Executed |
| 103 | Bing Executed |

Subsequently, in step S704, the data load execution unit 402 determines whether all the target customers have been processed in step S702 to step S704. When the determination is negative, the process returns to step S702 and the process is performed again. On the other hand, when the determination is affirmative, the process proceeds to step S705.

In step S705, the data load execution unit 402 executes the data load process on the plurality of target customers specified by the message obtained in step S701 as a batch process. Specifically, a data file to be subjected to the totaling stored in the file server 110 is loaded in the database 111. In this case, the data file to be loaded includes a difference added or updated after a preceding periodic totaling process, for example. Therefore, as a setting for indicating the load target data file, a date and time (common in all the customers) when the preceding periodic totaling process is performed is specified. Specifically, this process is independent from settings for individual customers.

In step S706, the data load execution unit 402 repeatedly performs the process from step S706 to step S710 on a number of unprocessed customers in the customers of the processing targets specified by the message obtained in step S701.

In step S707, the data load execution unit 402 changes totaling state of the customer being processed into "not executed".

In step S708, the data load execution unit 402 generates a totaling request message of the customer being processed. Note that this process is not performed when the process in step S703 fails on the customer being processed or when the process in step S705 fails.

In step S709, the message registration unit 403 registers the message generated in step S708 in the data totaling queue 108. Note that this process is not performed when the process in step S703 fails on the customer being processed or when the process in step S705 fails.

Subsequently, in step S710, the data load execution unit 402 determines whether all the target customers have been processed in step S706 to step S710. When the determination is negative, the process returns to step S706 and the process is performed again. On the other hand, when the determination is affirmative, the process proceeds to step S711.

In step S711, the message deletion unit 404 deletes the message obtained in step S701 from the data load queue 106.

In step S712, the data load execution unit 402 determines whether all the processes in step S703, step S705, step S708, and step S709 have been successfully performed. When the determination is affirmative, the process returns to step S701 and another message is processed. On the other hand, when the determination is negative, the process proceeds to step S713.

In step S713, the data load execution unit 402 registers a retry message in the data load queue 106 and the process returns to step S701 where another message is processed. The process of registering a retry message will be described hereinafter in detail.

Note that, when the preprocessing (S703) on the individual target customers has failed, the batch process (S705) may not be performed. On the other hand, in a case where the batch process (S705) fails after the preprocessing (S703) is successfully performed on the individual customers of processing targets, post-processing (S707 to S709) is performed on the individual customers of the processing targets.

Retry Message Registration Process

Figure 8:
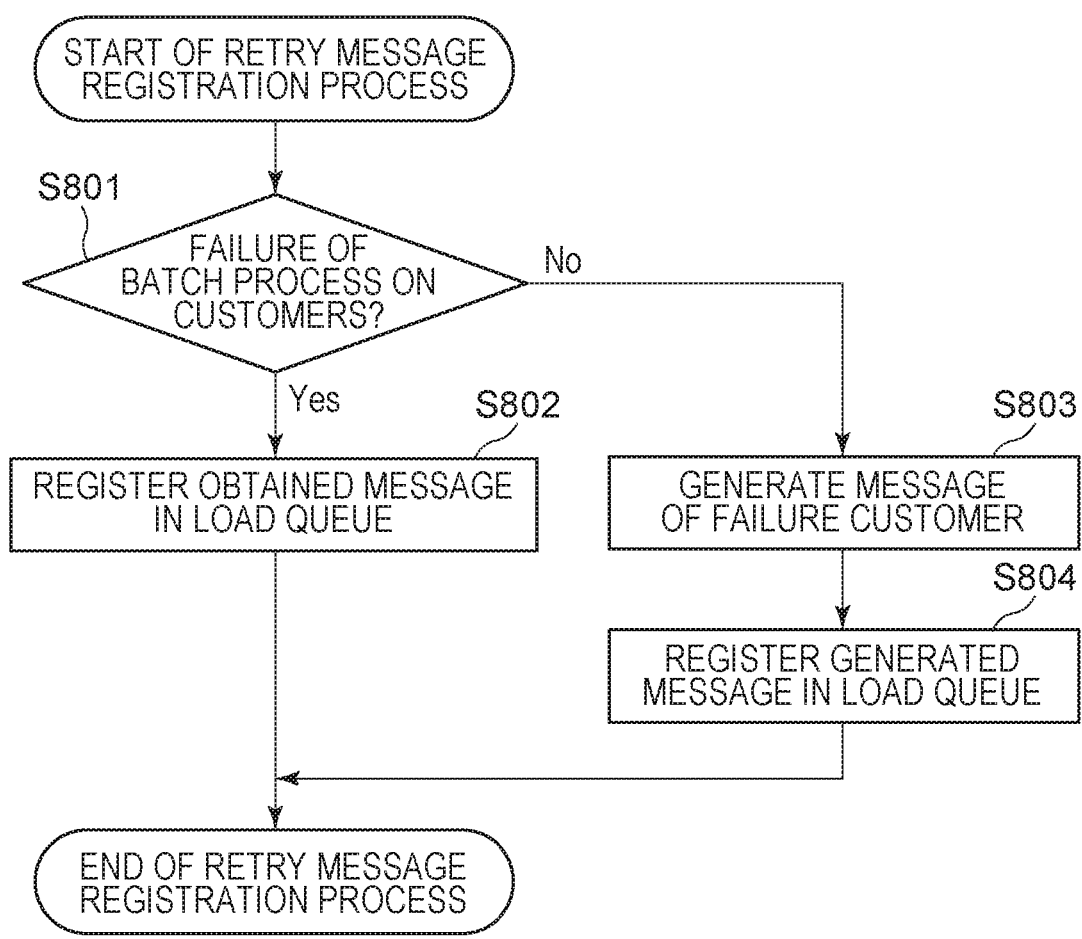
FIG. 8 is a flowchart illustrating an example of a procedure of a retry message registration process.

FIG. 8 is a flowchart illustrating an example of a procedure of the retry message registration process executed in step S713 of FIG. 7 in details. In the retry message registration process, when a portion of the data load process has failed, a message for performing retry is registered in the data load queue 106. The data load process includes the individual process performed on each customer and the batch process performed on a plurality of customers. When the process performed on each customer has failed, it is efficient that only failed customers are retried. Furthermore, when the batch process performed on a plurality of customers has failed, retry of the process is on all the customers of the processing targets. Therefore, in this process, a retry method is changed depending on a determination as to whether a failure has occurred in the process performed on individual customers or the batch process performed on a plurality of customers. Accordingly, the retry may be efficiently performed in the process including the batch process performed on a plurality of customers.

When the retry message registration process is started, the data load execution unit 402 determines whether the batch process performed on a plurality of customers (S705) has failed in step S801. When the determination is affirmative, the process proceeds to step S802. On the other hand, when the determination is negative, that is, the batch process performed on a plurality of customers has been successfully performed but the individual process performed on the each customer (S703, S708, and S709) has failed, the process proceeds to step S803.

In step S802, the data load execution unit 402 terminates this process after registering the message obtained in step S701 in the data load queue 106 as a retry message. When the batch process performed on a plurality of customers has failed, retry of the process is to be performed on all the customers of the processing targets. Therefore, the message (obtained in step S701) for requesting that all the customers of the processing targets are to be processed is determined as the retry message.

On the other hand, the data load execution unit 402 generates a message for requesting that only customers in which the process to be performed on each customer has failed are to be processed in step S803. Specifically, one message for requesting that the batch process is to be performed on the plurality of customers in which the process performed on each customer has failed.

In step S804, the data load execution unit 402 terminates this process after registering the message generated in step S803 in the data load queue 106 as a retry message.

Note that, when the batch process performed on a plurality of customers and the process performed on each customer have failed, the determination is affirmative in step S801, and therefore, the process in step S802 is performed.

Data Totaling Process

Figure 9:
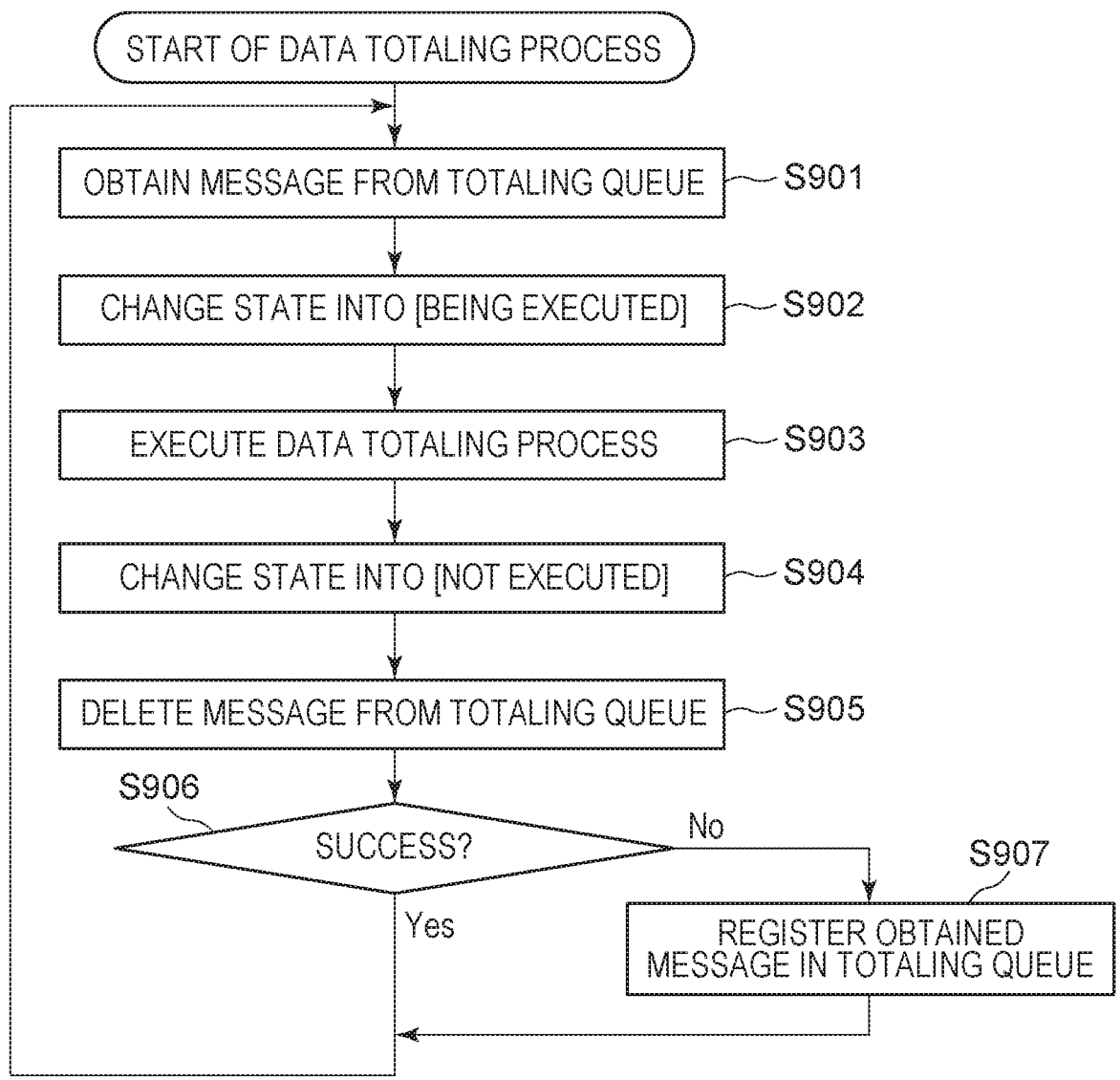
FIG. 9 is a flowchart illustrating an example of a procedure of a data totaling process.

FIG. 9 is a flowchart of an example of a procedure of the data totaling process executed by the data totaling execution unit 502. This process is executed when the data totaling server 109 checks messages registered in the data totaling queue 108 and detects an obtainable message. In this process, a totaling query is transmitted to the database 111 and a returned query result is stored as a totaling result. For example, data is subjected to the totaling process on a monthly basis based on a setting of a cutoff day of a customer. Therefore, the data totaling process depends on a setting for each customer unlike the data load process. Accordingly, the data totaling process may not be performed as a batch process on a plurality of customers but is performed on each customer.

When the data totaling process is started, the message obtaining unit 501 obtains one obtainable message from the data totaling queue 108 in step S901.

In step S902, the data totaling execution unit 502 changes a totaling state of a customer into "being executed". In this process, only when the totaling state of a customer is the state "not executed", the state is changed to the state "being executed". When the totaling state of a customer is the state "being executed", it is determined that the process performed on the target customer has failed.

In step S903, the data totaling execution unit 502 executes the data totaling process on the customer. In step S904, the data totaling execution unit 502 changes totaling state of the customer into "not executed". In step S905, the message deletion unit 503 deletes the message obtained in step S901 from the data totaling queue 108.

In step S906, the data totaling execution unit 502 determines whether all the processes in step S902 and step S903, have been successfully performed. When the determination is affirmative, the process returns to step S901 and another message is processed. On the other hand, when the determination is negative, the process proceeds to step S907.

In step S907, the data totaling execution unit 502 terminates this process after registering the message obtained in step S901 in the data totaling queue 108 as a retry message.

In this embodiment, the totaling instruction server 105 generates a message for processing a plurality of customers as a batch process and registers the message in the data load queue 106 and the data load server 107 performs the batch process based on the message. According to this embodiment, since the batch process is performed on a plurality of customers, the processing time may be reduced when compared with a case where the process is performed on each customer.

Second Embodiment

In the process executed after a message is obtained from a queue according to the first embodiment, as a retry method, the obtained message is removed from the queue irrespective of success or failure of the process and a retry message is re-registered in the queue when a retry is applicable. In this embodiment, another retry method using a characteristic of a queue in which a message is brought into a visible state after an invisible time has elapsed will be described. Note that portions different from the first embodiment will be described hereinafter.

Data Load Process

Figure 10:
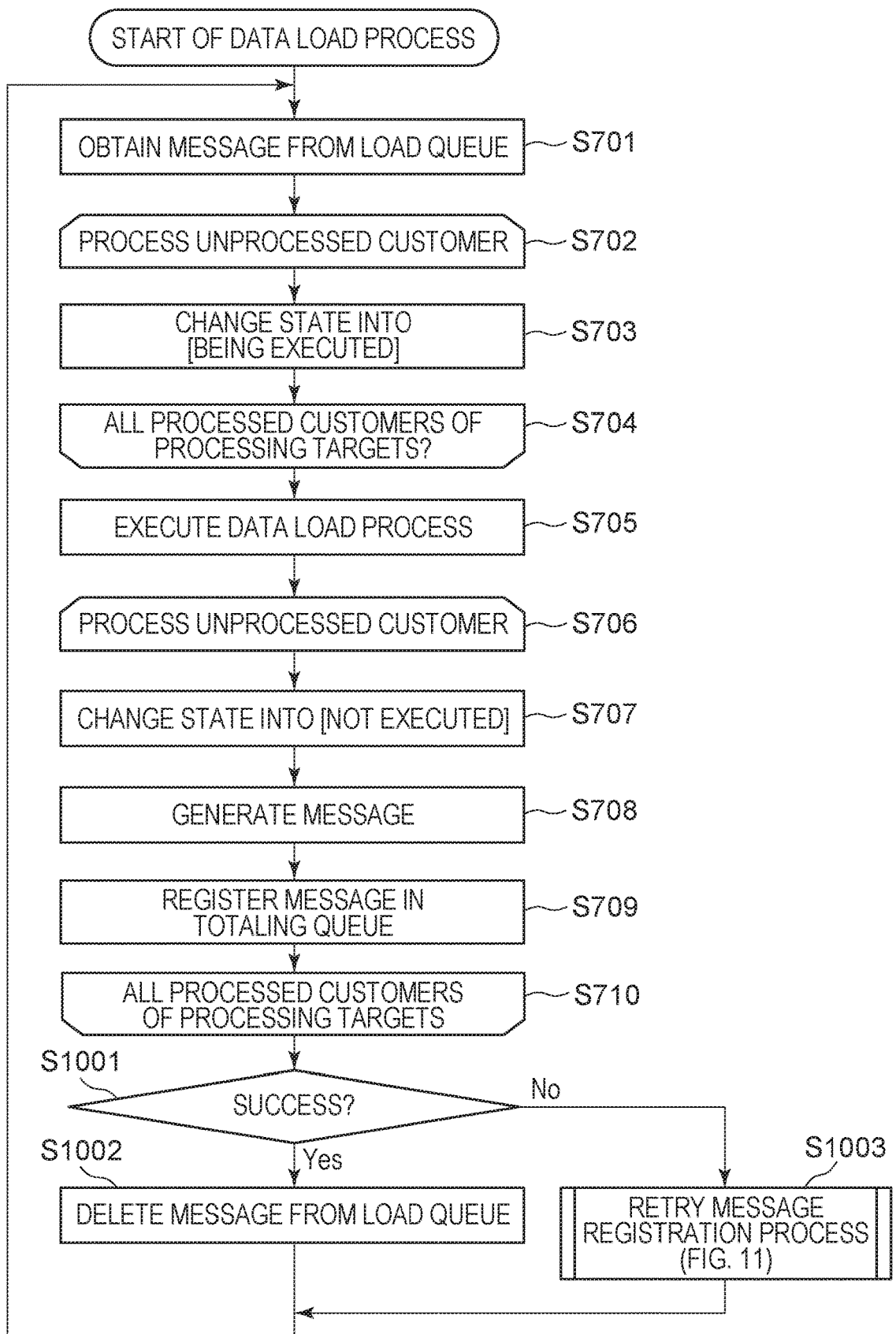
FIG. 10 is a flowchart illustrating an example of a procedure of a data load process according to a second embodiment.

FIG. 10 is a flowchart illustrating an example of a procedure of a data load process executed by a data load server 107 according to the second embodiment. This process is obtained by modifying the data load process according to the first embodiment illustrated in FIG. 7. In the second embodiment, another retry method using a characteristic of a queue in which a message is brought into a visible state after an invisible time has elapsed will be described. Therefore, the process after the process of deleting the obtained message from the queue irrespective of success or failure of the process (S711) is modified.

A process from step S701 to step S710 is the same as that of the first embodiment.

In step S1001, a data load execution unit 402 determines whether all the processes in step S703, step S705, step S708, and step S709 have been successfully performed. Here, when the determination is affirmative, the process proceeds to step S1002. On the other hand, when the determination is negative, the process proceeds to step S1003.

In step S1002, a message deletion unit 404 deletes a message obtained in step S701 from a data load queue 106 and the process returns to step S701 where another message is processed.

In step S1003, the data load execution unit 402 registers a retry message in the data load queue 106 and the process returns to step S701 where another message is processed. The process of registering a retry message according to the second embodiment will be described hereinafter in detail.

Retry Message Registration Process

Figure 11:
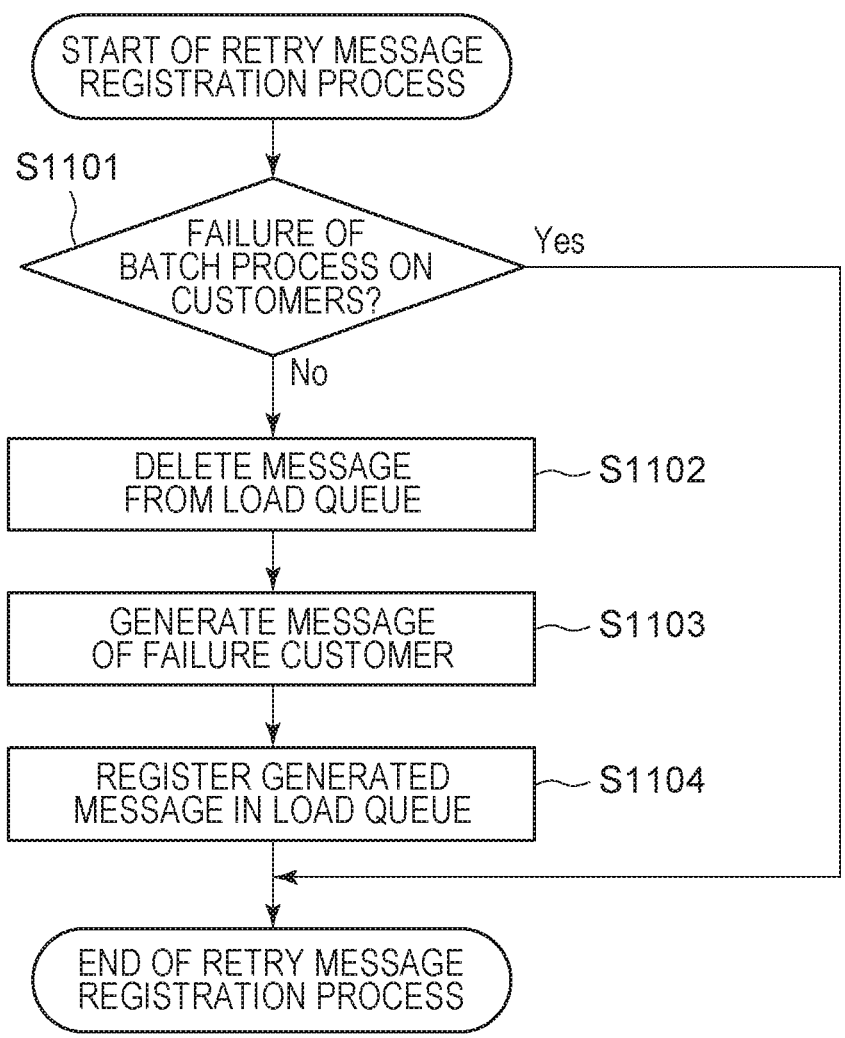
FIG. 11 is a flowchart illustrating an example of a procedure of a retry message registration process according to the second embodiment.

FIG. 11 is a flowchart illustrating an example of a procedure of the retry message registration process according to the second embodiment executed in step S1003 of FIG. 10 in details. This process is obtained by modifying the retry message registration process according to the first embodiment illustrated in FIG. 8. In the second embodiment, another retry method using a characteristic of a queue in which a message is brought into a visible state after an invisible time has elapsed will be described.

When a batch process performed on a plurality of customers (S705) in the data load process has failed, an associated message is not deleted from the data load queue 106. Then the message is brought into a visible state after an invisible time has elapsed and retry of the batch process is performed on a plurality of customers of processing targets.

On the other hand, when the process performed on each customer (S703 and S707 to S709) in the data load process has failed, it is efficient that retry of the process is performed only on failed customers. Accordingly, in this process, if the process performed on each customer has failed, a message is deleted from the queue and a message indicating that retry of the process is performed only on failed customers is generated and registered.

When the retry message registration process is started, the data load execution unit 402 determines whether the batch process performed on a plurality of customers (S705) has failed in step S1101. When the determination is negative, that is, the process performed on each customer (S703 and S707 to S709) has failed, the process proceeds to step S1102. On the other hand, when the determination is affirmative, this process is terminated. When the batch process performed on a plurality of customers has failed, retry of the process may be performed on all the customers of the processing targets when the message is brought into a visible state after the invisible time has elapsed.

In step S1102, a message deletion unit 404 deletes the message obtained in step S701 from the data load queue 106. In step S1103, the data load execution unit 402 generates a message for requesting that only customers in which the process to be performed on each customer has failed are to be processed. Specifically, one message for requesting that the batch process is to be performed on the plurality of customers in which the process performed on each customer has failed.

In step S1104, the data load execution unit 402 terminates this process after registering the message generated in step S1103 in the data load queue 106 as a retry message.

According to this embodiment, when the batch process performed on a plurality of customers has failed, an associated message is not deleted from the data load queue 106. Accordingly, retry may be efficiently performed using a characteristic of a queue in which a message is brought into a visible state after an invisible time has elapsed.

Note that the present disclosure includes apparatuses, systems, and methods configured by appropriately combining the foregoing embodiments.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-107071 filed May 30, 2017, which is hereby incorporated by reference herein in its entirety.

What is claimed is:

1. An information processing system using a system of a database which manages data on customers using tenants which are storage regions dedicated for the customers and using a queue in which a message for processing data of a processing target is registered, the information processing system comprising:
one or more memories storing instructions, and
one of more processors executing the instructions to:
receive a request for a process for data of processing targets, wherein the process requires accessing one or more tenants in the database;
generate a first message for performing a first process on the data of processing targets corresponding to the received request in a case where the received request is a request from a terminal apparatus via a web server and the data of the processing targets corresponding to the received request is first data not to be batch processed, wherein one tenant in the database manages the data of processing targets, and wherein the first message is a message for performing that requires accessing the one tenant corresponding to one customer in the database;

generate a second message for performing a second process on the data of processing targets corresponding to the received request in a case where the received request is a request for a periodic totaling process from a scheduler and the data of the processing targets corresponding to the received request is second data to be batch processed, wherein each of a plurality of tenants in the database manages one piece of data of processing targets, and wherein the second message is a message for performing a second process that requires accessing the plurality of tenants each corresponding to a different one of a plurality of customers in the database;

register the first message in the queue in a case where the first message is generated; and register the second message in the queue in a case where the second message is generated, wherein each message registered in the queue is obtained and executed by an execution system using at least one machine and the database, wherein, in a case where the first message is obtained, the first process that requires accessing the one tenant in the database is executed, and wherein, in a case where the second message is obtained, the second process that requires accessing the plurality of tenants in the database is executed.

2. The information processing system according to claim 1, wherein a number of machines is controlled based on a number of messages registered in the queue or a processing load of the execution system.

3. The information processing system according to claim 1, wherein the obtained message is deleted from the queue after the process performed by the execution process is successfully completed.

4. The information processing system according to claim 1, wherein the obtained message is re-registered in the queue when the second process performed by the execution system has failed according to the obtained message.

5. The information processing system according to claim 1, wherein the second process is a periodic totaling process.

6. The information processing system according to claim 1, wherein the data of processing targets is stored in a tenant in the database.

7. A method employed in an information processing system using a system of a database which manages data on customers using tenants which are storage regions dedicated for the customers and using a queue in which a message for processing data of a processing target is registered, the method comprising:

receiving a request for a process for data of processing targets, wherein the process requires accessing one or more tenants in the database;

generating a first message for performing a first process on the data of processing targets corresponding to the received request in a case where the received request is a request from a terminal apparatus via a web server and the data of the processing targets corresponding to the received request is first data not to be batch processed, wherein one tenant in the database manages the data of processing targets, and wherein the first message is a message for performing a process that requires accessing the one tenant corresponding to one customer in the database;

generating a second message for performing a second process on the data of processing targets corresponding to the received request in a case where the received request is a request for a periodic totaling process from a scheduler and the data of the processing targets corresponding to the received request is second data to be batch processed, wherein each of a plurality of tenants in the database manages one piece of data of processing targets, and wherein the second message is a message for performing a second process that requires accessing the plurality of tenants each corresponding to a different one of a plurality of customers in the database;

registering the first message in the queue in a case where the first message is generated; and registering the second message in the queue in a case where the second message is generated, wherein each message registered in the queue is obtained and executed by an execution system using at least one machine and the database, wherein, in a case where the first message is obtained, the first process that requires accessing the one tenant in the database is executed, and wherein, in a case where the second message is obtained, the second process that requires accessing the plurality of tenants in the database is executed.

8. The method according to claim 7, wherein the data of processing targets is stored in a tenant in the database.

9. The method according to claim 7, wherein a number of machines is controlled based on a number of messages registered in the queue or a processing load of the execution system.

10. The method according to claim 7, wherein the obtained message is deleted from the queue after the process performed by the execution process is successfully completed.

11. The method according to claim 7, wherein the obtained message is re-registered in the queue when the second process performed by the execution system has failed according to the obtained message.

12. The information processing system according to claim 7, wherein the second process is a periodic totaling process.

* * * * *